United States Patent [19]

Leach

[11] 4,338,600
[45] Jul. 6, 1982

[54] LIQUID CRYSTAL DISPLAY SYSTEM HAVING TEMPERATURE COMPENSATION

[75] Inventor: Jerald G. Leach, Houston, Tex.

[73] Assignee: Texas Instruments Incorporated, Dallas, Tex.

[21] Appl. No.: 168,920

[22] Filed: Jul. 14, 1980

[51] Int. Cl.³ .............................................. G09G 3/18
[52] U.S. Cl. .................................. 340/812; 340/765; 340/784; 350/331 T
[58] Field of Search ............... 340/765, 784, 811, 812; 350/331 T, 332

[56] References Cited

U.S. PATENT DOCUMENTS 4,057,325 11/1977 Kondo ............................. 350/331 T
4,128,311 12/1978 Smith et al. ..................... 350/331 T
4,236,150 11/1980 Chern ............................. 340/765 X

OTHER PUBLICATIONS

Hilsum, Holden, Raynes; "A Novel Method of Temperature Compensation for Multiplexed Liquid Crystal Displays"; Electronics Letters, 6 Jul. 1978, vol. 14, No. 14, pp. 430–432.

*Primary Examiner*—David L. Trafton
*Attorney, Agent, or Firm*—Robert D. Marshall, Jr.; Leo N. Heiting; Melvin Sharp

[57] ABSTRACT

A data processing system is disclosed having data processing means for providing data in either an encoded format or in a display format in respective first and second operating modes. Temperature compensated, liquid crystal display means responsive to the operating mode of the data processing means are provided for receiving the data provided thereby, converting any data received in the encoded format to the display format, and displaying all received data in the display format.

20 Claims, 4 Drawing Figures

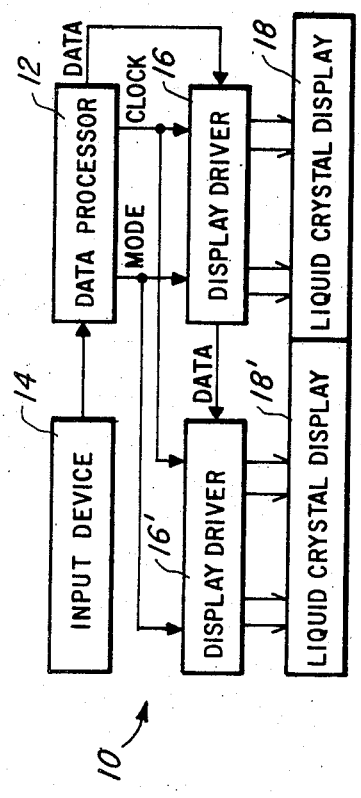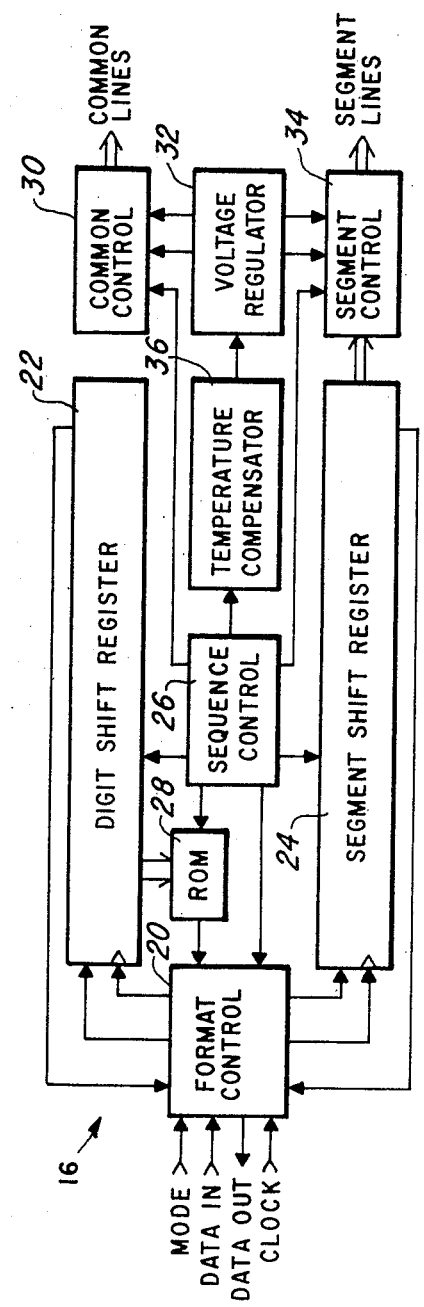

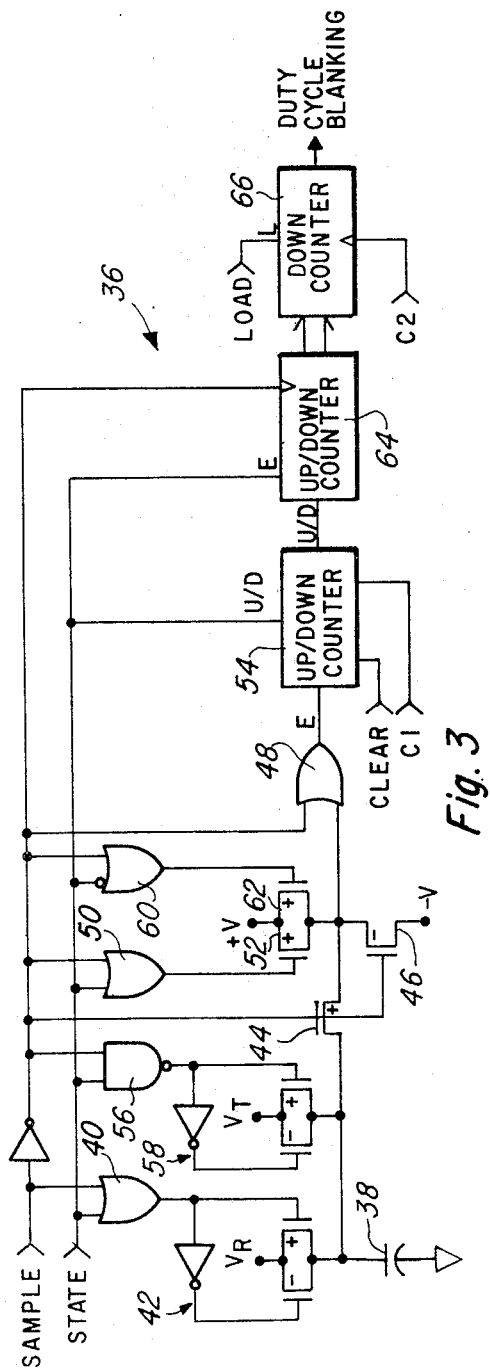
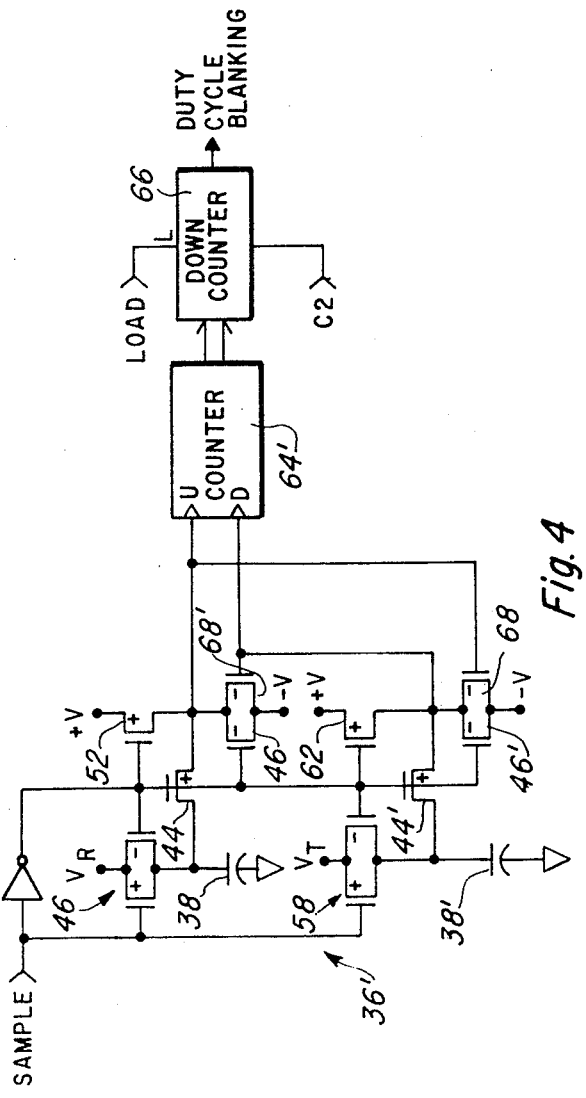
Fig. 3
Fig. 4

LIQUID CRYSTAL DISPLAY SYSTEM HAVING TEMPERATURE COMPENSATION

CROSS REFERENCE TO RELATED APPLICATIONS

Related subject matter may be found in the copending U.S. patent application filed simultaneously herewith by Howard Raeburn Test II and Michael Joseph Drury, entitled "Data Processing System Having Dual Output Modes" and assigned to the same Assignee.

BACKGROUND OF THE INVENTION

1. Field of the Invention

This invention relates generally to liquid crystal display systems and, more particularly, but not by way of limitation, to a liquid crystal display system having temperature compensation.

2. Prior Art Statement

In general, data processing systems have data processing means which provide output data for display to a user. In systems employing a liquid crystal display, operating voltages are typically selected so as to assure a particular optical contrast ratio at a selected design temperature. It has been discovered, however, that the contrast ratio varies as a function of the operating temperature of the display. Thus, the utility of the system will be adversely affected unless temperature compensation is provided. One technique for providing temperature compensation is shown and described in an article entitled "A Novel Method of Temperature Compensation for Multiplexed Liquid Crystal Displays" by C. Hilsum, R. J. Holden, and E. P. Raynes in the July 6, 1978 issue of *Electronics Letters* (G. B.), Vol. 14, No. 14, pp. 430–432, published by the Institution of Electrical Engineers, Savoy Place, London WC2R OBL, England.

SUMMARY OF THE INVENTION

Accordingly, it is an object of the present invention to provide a data processing system which has a temperature compensated liquid crystal display. In one preferred form of the invention, means are provided for alternately coupling one of the segments of the display to first and second voltages, and temperature compensation means are provided for determining the ratio of the capacitances of the segment when coupled to the first and second voltages, respectively. The second voltage is then changed to converge the ratio to a predetermined ratio value which has been selected to assure that the new second voltage will provide a more satisfactory contrast ratio. In one other embodiment, the first and second voltages are coupled to first and second segments, respectively, and the temperature compensation means determine the ratio of the respective capacitances. The second voltage is then changed to converge the ratio to the selected ratio value, so as to provide the desired contrast ratio.

Other objects and advantages of the present invention will be evident from the following detailed description when read in conjunction with the accompanying drawings which illustrate one preferred embodiment thereof.

BRIEF DESCRIPTION OF THE DRAWINGS

FIG. 1 is a block representation of a data processing system constructed in accordance with the preferred embodiment of the present invention.

FIG. 2 is a block representation of the display driver of the data processing system of FIG. 1.

FIG. 3 is a schematic representation of one preferred form of the temperature compensator of the display driver of FIG. 2.

FIG. 4 is a schematic representation of one other preferred form of the temperature compensator of the display driver of FIG. 2.

DESCRIPTION OF THE PREFERRED EMBODIMENT

Referring to the drawings in general, and to FIG. 1 in particular, shown therein and referred to by the general reference number 10 is a data processing system constructed in accordance with the preferred embodiment of the present invention. More particularly, the data processing system 10 comprises a data processor 12 which operates in a particular one of first and second operating modes depending upon input commands received from an input device 14. Although the present invention may be advantageously employed in data processing systems having a full range of computational capabilities and input options, the present description will be directed toward a data processing system 10 which has a data processor 12 constructed to perform operator selected operations, e.g. arithmetic, trignometic, etc., upon operands entered manually via a keyboard type input device 14.

In the first operating mode, the data processor 12 performs selected operations upon input data received from the input device 14, and provides output data in an encoded format generally in synchronization with a clock signal. In response to receiving a mode signal indicating that the data processor 12 is in the first operating mode, a first display driver 16 receives the output data provided by the data processor 12 in synchronization with the clock signal, and converts the received, encoded format data into a display format. The display driver 16 then displays the converted data in the display format via a suitable display 18. In the preferred form, the display driver 16 stores the data as received from the data processor 12 in the encoded format to obviate the necessity for the data processor 12 to periodically "refresh" the data. Preferably, the display driver 16 also stores the data after conversion from the encoded format into the display format in order to minimize the circuitry required to accomplish the conversion operation.

In the second operating mode, the data processor 12 performs selected operations upon input data received from the input device 14, and provides data in the display format generally in synchronization with the clock signal. In response to receiving a mode signal indicating that the data processor 12 is in the second operating mode, the display driver 16 receives the output data provided by the data processor 12 in synchronization with the clock signal, and then displays the data in the display format via the display 18. In the preferred form, the display driver 16 stores the data as received from the data processor 12 in the display format to obviate the necessity for the data processor 12 to periodically "refresh" the data.

If it is desired to provide a greater simultaneous output display capability, additional display drivers, such as the display driver 16' may be provided, together with an appropriate display 18'. In such a configuration, the display driver 16 will receive and display up to a predetermined maximum number of data elements as received from the data processor 12, with any additional data elements "overflowing" into the display driver 16'. Of course, additional display drivers (not shown) may be added to the chain so as to effectively increase the simultaneous output display capability of the data processing system 10.

In the preferred form of the display driver 16 shown in FIG. 2, a format control 20 receives input data provided by the data processor 12 (see FIG. 1) in synchronization with the clock signal. If the format control 20 determines from the mode signal that the data processor 12 is in the first operating mode, then the format control 20 will serially clock the received input data into a digit shift register 22 for storage therein. When the digit shift register 22 overflows, the format control 20 will provide the overflow data as output data for input to the next display driver 16', if provided. On the other hand, if the format control 20 determines from the mode signal that the data processor 12 is in the second operating mode, the format control 20 will serially clock the received input data into a segment shift register 24 for storage therein. When the segment shift register 24 is full, the format control 20 will provide the overflow data as output data for input to the next display driver 16', if provided.

Substantially independently of the cooperation of the format control 20 with the data processor 12, a sequence control 26 controls the sequential operation of the display-related portions of the display driver 16. Thus, for example, during each display time period, the sequence control 26 will sequentially enable the transfer of each of the various digits stored in the digit shift register 22 to a ROM 28 for conversion from the encoded format to the display format. Simultaneously, the sequence control 26 enables the format control 20 to shift the display formatted data provided serially by the ROM 28 into the segment shift register 24.

Periodically during each display time period, the sequence control 26 enables a common control 30 to selectively couple operating voltages provided by a voltage regulator 32 to selected ones of the common lines of the display 18. Generally in synchronization therewith, the sequence control 26 enables the segment shift register 24 to transfer selected portions of the segment data stored therein to a segment control 34. In response to the segment data, the segment control 34 selectively couples operating voltages provided by the voltage regulator 32 to the segment lines of the display 18.

As will be clear to those skilled in the art, the sequence control 26 can be constructed to operate according to any one of several well known timing schemes which facilitate generation of appropriate operating voltage sequences for a selected display 18. In the form shown in FIG. 2, the display driver 16 is particularly well suited for use with a liquid crystal type of display 18. In particular, a temperature compensator 36 is provided for monitoring the operating temperature of the liquid crystal display 18 and for interacting with the voltage regulator 32 to vary the effective RMS value of the applied operating voltages to maintain the contrast ratio within a predetermined range. In general, each inactive segment of the liquid crystal display 18 will be coupled to an "off segment" voltage, while each active segment will be coupled to an "on segment" voltage. Typically, the difference between the off and on segment voltages will be selected to provide a desired optical contrast ratio at a particular operating temperature. However, the same voltages may produce significantly different contrast ratios when the temperature of the segments vary from the design temperature. If, on the other hand, the segment voltages can be made to track the temperature-induced shift, the contrast ratio may be maintained relatively stable. For a more detailed discussion of the temperature-dependent response characteristics of liquid crystal displays, as well as one circuit technique for providing temperature compensation, reference may be made to an article entitled "A Novel Method of Temperature Compensation for Multiplexed Liquid Crystal Displays" by C. Hilsum, R. J. Holden, and E. P. Raynes in the July 6, 1978 issue of *Electronics Letters* (G. B.), Vol. 14, No. 14, pp. 430–432, published by the Institution of Electrical Engineers, Savoy Place, London WC2R, OBL, England. However, two alternative, preferred forms for the temperature compensator 36 are shown in FIGS. 3 and 4.

In the temperature compensator 36 shown in FIG. 3, a special thermometer segment 38 is provided as an integral portion of the liquid crystal display 18. For the purposes of the present invention, the thermometer segment 38 may be considered to be a lossless capacitor, the capacitance of which is constant below a threshold voltage but steadily increases up to threefold with increasing applied voltage. In addition, the capacitance exhibits the same rate of temperature variation as the rate of contrast ratio variation for optical purposes. The temperature compensator 36 is constructed to take advantage of this phenomenon by measuring the capacitance of the thermometer segment 38 at selected voltages above and below the threshold voltage.

In the illustrated form, the sequence control 26 provides a Sample signal in each of a logical low and logical high condition during each of a logical low and logical high condition of a State signal, thereby defining four operating states of the temperature compensator 36. In the first operating state, when both the Sample and State signals are in the logical low condition, an OR gate 40 enables a conventional transfer gate 42 to couple the thermometer segment 38 to a reference voltage $V_R$ provided by the voltage regulator 32 at a selected RMS value below the threshold voltage, e.g. zero (0) volts RMS, to precondition the thermometer segment 38 to a reference capacitance $C_R$. Simultaneously, a transistor 44 is disabled and a transistor 46 is enabled thereby clamping a first input of an OR gate 48 to a logical low potential $-V$. In the second operating state, when the Sample signal is in the logical high condition and the State signal is in the logical low condition, the transfer gate 42 and the transistor 46 are each disabled, and the transistor 44 is enabled thereby coupling the thermometer segment 38 to the first input of the OR gate 48. Simultaneously, an OR gate 50 enables a transistor 52, thereby charging the thermometer segment 38 toward a logical high potential $+V$. However, the simultaneous existence of logical low conditions on both inputs to the OR gate 48 and to an up/down control input, enables an up/down counter 54 to count up, generally in synchronization with a first clock signal C1, from an initial value of zero (0) established in response to a clear signal provided by the sequence control 26 during the first operating state. As soon as the transistor 52 has charged the thermometer segment 38 to a predetermined logical threshold voltage, the OR gate 48 will disable the up/down counter 54, thereby capturing a reference count which is related to the time required to charge the thermometer segment 38 from the reference voltage $V_R$ to the logical threshold voltage.

In the third operating state, when the Sample signal is again in the logical low condition but the State signal is in the logical high condition, an AND gate 56 enables a conventional transfer gate 58 to couple the thermometer segment 38 to a test voltage $V_T$ provided by the voltage regulator 32 at a selected RMS value above the threshold voltage, to precondition the thermometer segment 38 to a test capacitance $C_T$. As in the first operating state, the transistor 44 is disabled and the transistor 46 is enabled, again clamping the first input of the OR gate 48 to the logical low potential $-V$. In the fourth operating state, the transfer gate 58 and the transistor 46 are disabled, and the transistor 44 is enabled thereby coupling the first input of the OR gate 48 to the thermometer segment 38. Simultaneously, an OR gate 60 enables a transistor 62 to charge the thermometer segment 38 toward the logical high potential $+V$. The simultaneous existence of logical low conditions on both inputs to the OR gate 48 and to the logical high condition on the up/down control input, enables the up/down counter 54 to count down from the reference count in synchronization with the clock signal C1. As soon as the transistor 62 has charged the thermometer segment 38 to the logical threshold voltage, the OR gate 48 will disable the up/down counter 54, thereby capturing a difference count which is indicative of the difference between the time required to charge the thermometer segment 38 from the reference voltage $V_R$ to the logical threshold voltage and the time required to charge the thermometer segment 38 from the test voltage $V_T$ to the logical threshold voltage.

As will be clear to those skilled in the art, the time required to charge the thermometer segment 38 is related to both the capacitance thereof as well as the level of charging current coupled thereto. Therefore, by constructing each of the transistors 52 and 62 to provide appropriately selected levels of current, it is possible to determine the capacitance of the thermometer segment 38 at the time of measurement. For example, assume that the thermometer segment 38 has been preconditioned by the transfer gate 42 to the capacitance which is characteristic of the particular liquid crystal display 18 when charged to a reference voltage $V_R$ below the threshold voltage. Then, upon coupling the thermometer segment 38 to the potential $+V$ via the transistors 52 and 44, the voltage at the first input of the OR gate 48 will rise at a rate related to the reference current $I_R$ provided by the transistor 52. Thus, the reference count captured by the up/down counter 54 will provide a relative measure of the reference capacitance $C_R$.

Assume now that the thermometer segment 38 has been preconditioned by the transfer gate 58 to the capacitance which is characteristic of the particular liquid crystal display 18 when charged to a selected test voltage $V_T$ above the threshold voltage. Then, upon coupling the thermometer segment 38 to the potential $+V$ via the transistors 62 and 44, the voltage at the first input of the OR gate 48 will rise at a rate related to the test current $I_T$ provided by the transistor 62. Thus, the difference count captured by the up/down counter 54 will be zero (0), if and only if the ratio of the test current $I_T$ provided by the transistor 62 to the test capacitance $C_T$ of the thermometer segment 38 is the same as the ratio of the reference current $I_R$ provided by the transistor 52 to the reference capacitance $C_R$ of the thermometer segment 38. Stated another way, the difference count will be zero (0) if and only if the ratio of the test capacitance $C_T$ of the thermometer segment 38 to the reference capacitance $C_R$ thereof is the same as the ratio of the test current $I_T$ to the reference current $I_R$.

Recalling that the test capacitance $C_T$ is related both to temperature and to the test voltage $V_T$, it will be evident that changes in temperature as determined from changes in the test capacitance $C_T$ may be compensated for by suitable changes in the test voltage. Thus, changes may be made in the test voltage $V_T$ until the test capacitance $C_T$ is just sufficient so as to be charged by the test current $I_T$ at the same rate as in the reference case. In other words, the ratio of the test capacitance $C_T$ to the reference capacitance $C_R$ may be converged to the same, predetermined ratio as the test current $I_T$ bears to the reference current $I_R$ by changing the test voltage $V_T$. In the preferred embodiment, the test voltage $V_T$ is changed using a duty cycle blanking technique such as that described in U.S. Pat. No. 4,257,045 of L. L. Miles entitled "RMS Voltage Control with Variable Duty Cycle For Matching Different Liquid Crystal Material" and assigned to the Assignee of the present invention.

At the start of each of the first operating states, that is, when the State and Sample signals are both in the logical low condition, an up/down counter 64 is enabled and will either increment or decrement a duty cycle blanking count maintained therein depending upon the polarity of the difference count last captured by the up/down counter 54. For example, the duty cycle blanking count will be decremented if the last difference count was positive, indicating that the test capacitance $C_T$ was too small relative to the reference capacitance $C_R$. The new duty cycle blanking count is thereafter periodically loaded into a down counter 66, and the voltage regulator 32 simultaneously disabled. In synchronization with a second clock signal C2, the down counter 66 will decrement the loaded duty cycle blanking count, until an underflow condition occurs. Upon underflow, the down counter 66 will enable the voltage regulator 32. Since the voltage regulator 32 will now be disabled for one less period of the clock signal C2, the RMS values of the various operating voltages, including the test voltage $V_T$, will be increased. Under the influence of the increased test voltage $V_T$, the thermometer segment 38 will exhibit more test capacitance $C_T$.

On the other hand, the duty cycle blanking count will be incremented if the preceding difference count was negative, indicating that the test capacitance $C_T$ was too large relative to the reference capacitance $C_R$. The increase in the duty cycle blanking count will result in a later occurrence of the underflow condition, thereby decreasing the effective RMS value of the various operating voltages, including the test voltage $V_T$. Under the influence of the reduced test voltage $V_T$, the thermometer segment 38 will exhibit less test capacitance $C_T$.

For example, one embodiment has been constructed to provide a preconditioning period of the order of one (1) second and a sampling interval of the order of 100 microseconds. When used with a liquid crystal display 18 manufactured by Shinshu Seiki Co., Ltd., and commercially available from Epson America, Inc. of Torrence, Calif., as part number LD-B955B, 1.11 was selected as the ratio of the test current $I_T$ to the referece current $I_R$ and thus the ratio of the test capacitance $C_T$ to the reference capacitance $C_R$. Thus, the transistor 62 was constructed to provide 11% more current than the transistor 52. This particular ratio was selected because, upon the convergence thereto of the ratio of the test capacitance $C_T$ to the reference capacitance $C_R$, the test voltage $V_T$ will approximate the optical threshold voltage of the display 18, and thus may be used directly as the off segment voltage. Since the on segment voltage may be generated relative to the off segment voltage, using the same duty cycle blanking technique, both will now automatically track the temperature-induced shift in optical response.

In the temperature compensator 36 shown in FIG. 4, first and second, substantially identical thermometer segments 38 and 38' are provided as an integral portion of the liquid crystal diplay 18. Recall, however, that the capacitance of each of the thermometer segments 38 and 38' is relatively constant below a threshold voltage, and steadily increases up to threefold with increasing applied voltage. Since the capacitance of each exhibits the same rate of temperature variation as the rate of contrast ratio variation, the temperature compensator 36' may compensate for the latter variation by measuring the capacitance of the thermometer segment 38' at a selected voltage above the threshold voltage relative to the capacitance of the thermometer segment 38 at a voltage below the threshold voltage.

In the illustrated form, the sequence control 26 provides a Sample signal in each of a logical low and a logical high condition, thereby defining two operating states of the temperature compensator 36'. In the first operating state, when the Sample signal is in the logical low condition, a conventional transfer gate 42 couples the thermometer segment 38 to a reference voltage $V_R$ provided by the voltage regulator 32 at a selected RMS voltage below the threshold voltage, e.g. zero (0) volts RMS, to precondition the thermometer segment 38 to a reference capacitance $C_R$. The logical low condition of the Sample signal also enables a conventional transfer gate 58 to couple the thermometer segment 38' to a test voltage $V_T$ provided by the voltage regulator 32 at a selected RMS value above the threshold voltage, to precondition the thermometer segment 38' to a test capacitance $C_R$. Simultaneously, transistors 44 and 44' are disabled, and transistors 46 and 46' are enabled, thereby clamping each of the up and down count inputs of an up/down counter 64' to a logical low potential $-V$.

In the second operating state, when the Sample signal is in the logical high condition, the transfer gates 42 and 58 and the transistors 46 and 46' are each disabled, and the transistors 44 and 44' each enabled, thereby coupling the thermometer segments 38 and 38' respectively to the up and down count inputs of the up/down counter 64'. Simultaneously, transistors 52 and 62 are enabled, thereby starting each of the thermometer segments 38 and 38' charging toward a logical high potential $+V$. If the first thermometer segment 38 charges to the gate threshold voltage of a transistor 68 before the second thermometer segment 38' charges to the gate threshold voltage of a transistor 68', indicating that the test capacitance $C_T$ is too large, then the transistor 68 will be enabled, clamping the down count input of the up/down counter 64' to the logical low potential $-V$. As soon as the thermometer segment 38 has charged to the logical threshold voltage of the up count input, the up/down counter 64' will increment a duty cycle blanking count maintained therein. The incremented duty cycle blanking count will thereafter be periodically loaded into a down counter 66, and the voltage regulator 32 simultaneously disabled. In synchronization with a clock signal C2, the down counter 66 will decrement the loaded duty cycle blanking count, until an underflow condition occurs. Upon underflow, the down counter 66 will enable the voltage regulator 32. Since the voltage regulator 32 will now be disabled for one more period of the clock signal C2, the RMS values of the various operating voltages, including the test voltage $V_T$ will be decreased. Under the influence of the lower test voltage $V_T$, the thermometer segment 38' will exhibit less test capacitance $C_T$.

On the other hand, if the thermometer segment 38' is the first to charge to the gate threshold voltage of the transistor 68', indicating that the test capacitance $C_T$ is too small, the transistor 68' will be enabled, clamping the up clock input to the logical low potential $-V$. As soon as the thermometer segment 38' has charged to the logical threshold voltage of the down count input, the up/down counter 64' will decrement the duty cycle blanking count maintained therein. The decremented duty cycle blanking count will thereafter be periodically loaded into the down counter 66', thereby advancing by one clock cycle the occurrence of the underflow condition and increasing the effective RMS value of the various operating voltages, including the test voltage $V_T$. Under the influence of the increased test voltage $V_T$, the thermometer segment 38' will exhibit more test capacitance $C_T$.

For example, one embodiment has been constructed to provide a preconditioning period of the order of one (1) second and a sampling interval of the order of 100 microseconds. When used with a liquid crystal display 18 manufactured by Shinshu Seiki Co., Ltd., and commercially available from Epson America, Inc. of Torrence, Calif. as part number LD-B955B, 1.11 was selected as the ratio of the test current $I_T$ to the reference current $I_R$ and thus the ratio of the test capacitance $C_T$ to the reference capacitance $C_R$. Thus, the transistor 62 was constructed to provide 11% more current than the transistor 52. This particular ratio was selected because, upon the convergence thereto of the ratio of the test capacitance $C_T$ to the reference capacitance $C_R$, the test voltage $V_T$ will approximate the optical threshold voltage of the display 18, and thus may be used directly as the off segment voltage. Since the on segment voltage may be generated relative to the off segment voltage, using the same duty cycle blanking technique, both will now automatically track the temperature-induced shift in optical response.

In summary, a data processing system 10 has been described wherein a data processor 12 performs selected operations on input data provided by an input device 14, and provides output data in either an encoded or a decoded format in respective first and second operating modes. One or more display drivers 16—16', responsive to the operating mode of the data processor 12, receives the output data, converts any data received in the encoded format, and displays all received data in the display format via associated displays 18—18'. For displays of the liquid crystal type, temperature compensation for shifts in optical contrast may be provided using either of two disclosed techniques: (1) converging to a predetermined ratio value the ratio of the capacitances of a segment of the display when preconditioned using a predetermined reference voltage and a variable test voltage; or (2) converging to a predetermined ratio value the ratio of the capacitance of a first segment of the display when preconditioned using a predetermined reference voltage to the capacitance of a second segment of the display when preconditioned using a variable test voltage. The first technique has the advantage of using less of the active surface area of the display 18, while the second technique has the advantage of speed of convergence since the reference and test capacitances are measured simultaneously rather than sequentially.

Although the present invention has been described herein in the context of particular embodiments, various changes or modifications may be made in the construction or arrangement of the parts or elements of the disclosed embodiments without departing from the spirit and scope of the invention as set forth in the appended claims.

What is claimed is:

1. A liquid crystal display system comprising:
   a liquid crystal display segment;
   display drive means for alternately coupling the segment to first and second voltages; and
   temperature compensation means for determining the ratio of the capacitance of the segment when coupled to the first voltage to the capacitance of the segment when coupled to the second voltage, and for changing the second voltage to converge said ratio toward a predetermined ratio value.

2. The display system of claim 1 wherein the first and second voltages have predetermined RMS values.

3. The display system of claim 2 wherein the second voltage is changed by varying the duty cycle blanking thereof.

4. The display system of claim 1 or 2 wherein the first voltage has a predetermined value below a predetermined threshold voltage of said segment.

5. The display system of claim 4 wherein the second voltage has a selected value above said threshold voltage of said segment.

6. A display drive circuit for use in a liquid crystal display system having a liquid crystal display segment, the drive circuit comprising:
   display drive means for alternately coupling the segment to first and second voltages; and
   temperature compensation means for determining the ratio of the capacitance of the segment when coupled to the first voltage to the capacitance of the segment when coupled to the second voltage, and for changing the second voltage to converge said ratio toward a predetermined ratio value.

7. The display drive circuit of claim 6 wherein the first and second voltages have predetermined RMS values.

8. The display drive circuit of claim 7 wherein the second voltage is changed by varying the duty cycle blanking thereof.

9. The display drive circuit of claim 6 or 7 wherein the first voltage has a predetermined threshold voltage of said segment.

10. The display drive circuit of claim 9 wherein the second voltage has a selected value above said threshold voltage of said segment.

11. A liquid crystal display system comprising:
    first and second liquid crystal display segments;
    display drive means for coupling the first segment to a predetermined first voltage, and the second segment to a second voltage; and
    temperature compensation means for determining the ratio of the capacitance of the first segment when coupled to the first voltage to the capacitance of the second segment when coupled to the second voltage, and for changing the second voltage to converge said ratio toward a predetermined ratio value.

12. The display system of claim 11 wherein the first and second voltages have predetermined RMS values.

13. The display system of claim 12 wherein the second voltage is changed by varying the duty cycle blanking thereof.

14. The display system of claim 11 or 12 wherein the first voltage has a predetermined value below a predetermined threshold voltage of said segment.

15. The display system of claim 14 wherein the second voltage has has a selected value above said threshold voltage of said segment.

16. A display drive circuit for use in a liquid crystal display system having first and second liquid crystal display segments, the drive circuit comprising:
    display drive means for coupling the first segment to a first voltage, and the second segment to a second voltage; and
    temperature compensation means for determining the ratio of the capacitance of the first segment when coupled to the first voltage to the capacitance of the second segment when coupled to the second voltage, and for changing the second voltage to convert said ratio toward a predetermined ratio value.

17. The display drive circuit of claim 16 wherein the first and second voltages have predetermined RMS values.

18. The display drive circuit of claim 17 wherein the second voltage is changed by varying the duty cycle blanking thereof.

19. The display drive circuit of claim 16 or 17 wherein the first voltage has a predetermined value below a predetermined threshold voltage of said segment.

20. The display drive circuit of claim 19 wherein the second voltage has a selected value above said threshold voltage of said segment.

* * * * *